(12) United States Patent
Stoller et al.

(10) Patent No.: US 8,173,953 B2
(45) Date of Patent: May 8, 2012

(54) GAIN STABILIZATION OF GAMMA-RAY SCINTILLATION DETECTOR

(75) Inventors: Christian Stoller, Princeton Junction, NJ (US); Peter Wraight, Skillman, NJ (US); Matthieu Simon, Princeton, NJ (US)

(73) Assignee: Schlumberger Technology Corporation, Sugar Land, TX (US)

( * ) Notice: Subject to any disclaimer, the term of this patent is extended or adjusted under 35 U.S.C. 154(b) by 937 days.

(21) Appl. No.: 12/268,211

(22) Filed: Nov. 10, 2008

(65) Prior Publication Data

US 2010/0116978 A1    May 13, 2010

(51) Int. Cl.
*G01V 5/00* (2006.01)
*G01T 1/20* (2006.01)
(52) U.S. Cl. .................................... 250/262; 250/361 R
(58) Field of Classification Search .......... 250/254–262, 250/269.2
See application file for complete search history.

(56) References Cited

U.S. PATENT DOCUMENTS

| | | | |
|---|---|---|---|
| 3,922,541 A | 11/1975 | Seeman | |
| 4,346,590 A * | 8/1982 | Brown | 250/256 |
| 4,958,080 A | 9/1990 | Melcher | |
| 5,023,449 A | 6/1991 | Holenka et al. | |
| 5,326,970 A | 7/1994 | Bayless | |
| 5,360,975 A | 11/1994 | Stoller | |
| 5,635,712 A * | 6/1997 | Scott et al. | 250/260 |
| 6,051,830 A | 4/2000 | Moake | |
| 7,067,816 B2 | 6/2006 | Dorenbos et al. | |
| 7,081,616 B2 | 7/2006 | Grau et al. | |
| 7,084,403 B2 | 8/2006 | Srivastava et al. | |
| 7,202,456 B2 | 4/2007 | Mickael | |
| 7,297,954 B2 * | 11/2007 | Kurashige et al. | 250/361 R |
| 2008/0251709 A1 | 10/2008 | Cooke | |

\* cited by examiner

*Primary Examiner* — David Porta
*Assistant Examiner* — Faye Boosalis
(74) *Attorney, Agent, or Firm* — Jeremy Berman; Darla P. Fonseca; Jody DeStefanis

(57) ABSTRACT

Systems and methods for stabilizing the gain of a gamma-ray spectroscopy system are provided. In accordance with one embodiment, a method of stabilizing the gain of a gamma-ray spectroscopy system may include generating light corresponding to gamma-rays detected from a geological formation using a scintillator having a natural radioactivity, generating an electrical signal corresponding to the light, and stabilizing the gain of the electrical signal based on the natural radioactivity of the scintillator. The scintillator may contain, for example, naturally radioactive elements such as Lutetium or Lanthanum.

30 Claims, 10 Drawing Sheets

GAIN STABILIZATION OF GAMMA-RAY SCINTILLATION DETECTOR

BACKGROUND OF THE INVENTION

The present invention relates generally to gamma-ray scintillation involved in well drilling or well logging operations and, more particularly, to stabilizing the gain of a gamma-ray scintillation detector involved in well drilling or well logging operations.

Spectroscopic analysis of data from nuclear well logging operations may provide quantitative or qualitative information related to a geological formation surrounding a borehole. By measuring spectra of nuclear radiation (e.g., gamma-rays) emitted by the formation and comparing the measured spectra to those of known chemical components, a general composition of the formation may be discerned. The composition of the formation may imply certain petrophysical characteristics associated with the formation, such as porosity, matrix lithology, and water salinity. Alternatively, gamma radiation or x-rays emitted by a source mounted in the logging tool can be measured by one or more detectors in the logging tool after the radiation has been scattered in the formation in such a way that it can be detected by the detector. The amount of radiation scattered back from the formation or borehole and its energy spectrum can give quantitative information on the electron density and photoelectric factor of the formation.

Radiation emitted or scattered by the formation may be measured with a scintillation detector. When radiation from the formation strikes the scintillation detector, the detector may produce an electrical signal corresponding to the energy deposited by the radiation in the scintillator. Because the scintillation detector may not operate at a predictable constant gain, techniques for stabilizing the gain have been developed. Such techniques may generally involve placing a radioactive source with a well-defined gamma-ray energy near the detector while x-ray and gamma-ray radiation emitted by or returning from the formation or the borehole is being detected. The gamma-ray peak from the stabilization source in the detected spectrum may thereafter be used as a reference for determining and stabilizing the gain of the system. Reliance on a radioactive source placed near the detector may introduce a number of disadvantages, however, as using radioactive sources may imply burdensome regulations, the sources may have limited useful lives (e.g., 1 to 15 years), the strength of the sources may need monitoring, and the encapsulation of the sources may not be guaranteed beyond a certain predefined period after the date of manufacture.

SUMMARY

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In accordance with one embodiment, a method of stabilizing the gain of a gamma-ray or x-ray spectroscopy system may include generating light corresponding to gamma-rays detected from a geological formation using a scintillator having a natural radioactivity, generating an electrical signal corresponding to the light, and stabilizing the gain of the electrical signal based on the natural radioactivity of the scintillator. The scintillator may contain, for example, naturally radioactive elements such as Lutetium or Lanthanum.

BRIEF DESCRIPTION OF THE DRAWINGS

Advantages of the invention may become apparent upon reading the following detailed description and upon reference to the drawings in which.

DETAILED DESCRIPTION OF SPECIFIC EMBODIMENTS

One or more specific embodiments of the present invention are described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
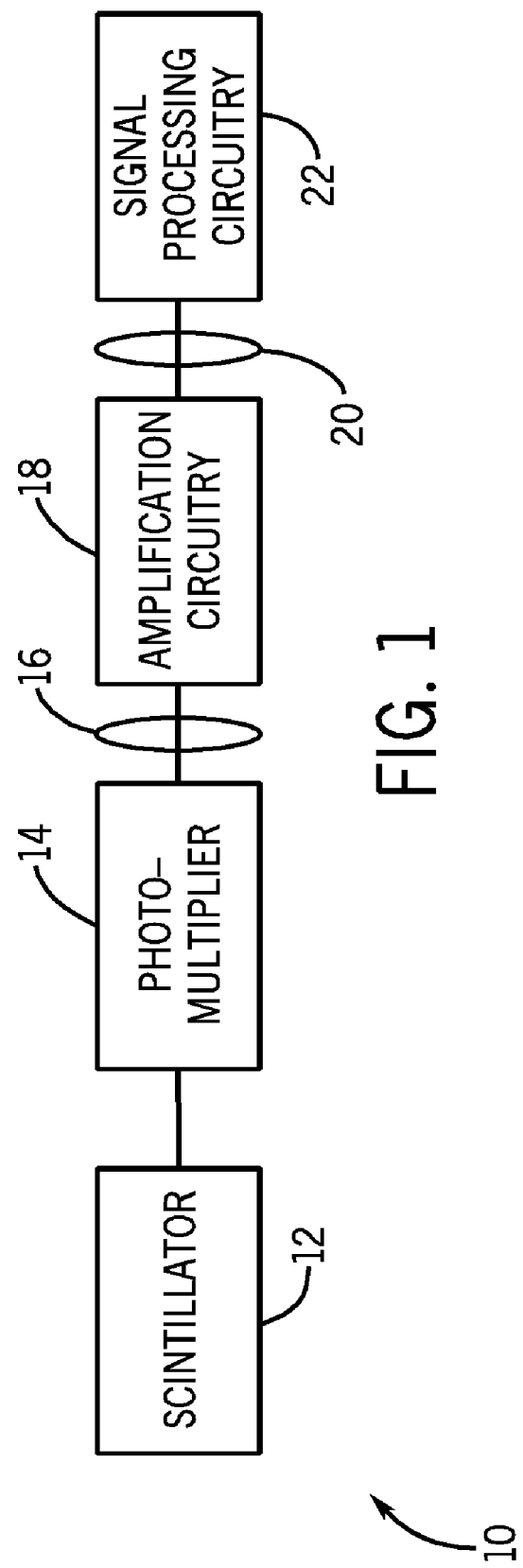
FIG. 1 is a block diagram of a gamma-ray spectroscopy system in accordance with an embodiment.

FIG. 1 illustrates a gamma-ray spectroscopy system 10 configured for use in nuclear well logging operations. The gamma-ray spectroscopy system 10 may provide spectroscopic analysis of gamma-rays or x-rays from a surrounding geological formation or borehole to determine, among other things, a general composition of the formation. Rather than maintain an external radiation source near a scintillator for gain stabilization, the gamma-ray spectroscopy system 10 may employ a scintillator 12 having a natural radioactivity. Using techniques described below, the gamma-ray spectroscopy system 10 may stabilize the gain of the system using the natural radioactivity of the scintillator 12.

The scintillator 12 may represent any scintillator having a natural radioactivity. Thus, the scintillator 12 may represent, for example, a scintillator based at least in part on Lutetium Silicate (LSO), Lutetium Aluminum Perovskite (LuAP), Lutetium Aluminum Garnet (LuAG), or Lanthanum (La). Such scintillators may include those by Saint Gobain or General Electric, as generally described in U.S. Pat. Nos. 7,067, 816 and 7,084,403, which are hereby incorporated by reference. Alternatively, the scintillator 12 may represent any other scintillator containing a naturally occurring radioactive isotope such as, for example, Bismuth Germanium Oxide (BGO) containing $^{207}$Bi.

When a gamma-ray strikes the scintillator 12, the energy deposited by the gamma-ray may be converted into light and received by a photodetector such as a photomultiplier 14 or any other device suitable for converting light into an electrical signal like an avalanche photodiode (APD). Gamma-rays detected by the scintillator 12 may arise from external radiation or from the internal radioactivity of the scintillator 12. Thus, as described below, an external reference source of radiation may be avoided for the purpose of stabilizing the gain of the gamma-ray spectroscopy system 10. Moreover, the source of radioactivity within the scintillator 12 may be uniformly distributed throughout the scintillator 12. As such, the corresponding response of the scintillator 12 to the internal radiation source may be insensitive to non-uniformities in the light generation or transport in the scintillator 12, providing another advantage over a discrete external radiation source.

After the light output by the scintillator 12 is received by the photomultiplier 14, the photomultiplier 14 may convert the light from the scintillator 12 into an electrical signal 16. It should be understood that the gamma-ray spectroscopy system 10 may alternatively employ multi-channel plate multipliers, channeltrons, or solid state devices such as Avalanche Photo Diodes in lieu of the photomultiplier 14. The electrical signal 16 may be amplified by amplification circuitry 18, which may provide an amplified signal 20 to signal processing circuitry 22. The signal processing circuitry 22 may include a general or special-purpose processor, such as a microprocessor or field programmable gate array, and may perform a spectroscopic analysis of the electrical signal, which may include the gain stabilization techniques described herein. The signal processing circuitry 22 may additionally include a memory device or a machine-readable medium such as Flash memory, EEPROM, ROM, CD-ROM or other optical data storage media, or any other storage medium that may store data or instructions for carrying out the following techniques.

Because the output of the scintillator 12, the photomultiplier 14, and the amplification circuitry 18 may depend highly upon external factors, such as temperature, the age of internal components, or gamma-ray count rate, to name a few, the signal processing circuitry 22 may stabilize the gain of the amplified signal 20. Stabilizing the gain of the amplified signal 20 may ensure a consistent gain across variable conditions, such as variances in temperature or the age of the gamma-ray spectroscopy system 10, i.e. the electrical signal will have the same pulse height for a given amount of energy deposited in the scintillation crystal independent of temperature, age, detector count rate and other factors that can affect the total gain of the system. The gain stabilization approaches employed by the signal processing circuitry 22 may rely not on an external radiation source, but rather the natural radioactivity of the scintillator 12.

As noted above, the scintillator 12 may include a naturally radioactive material that may serve as a reference source of radiation. For explanatory purposes, the scintillator 12 may be a Lutetium Aluminum Perovskite (LuAP) scintillator. The LuAP scintillator may have a natural radioactivity as a certain isotope of Lutetium decays within the LuAP scintillator. The decay of the Lutetium generates beta and gamma radiation that may interact with the scintillator 12 to generate a corresponding scintillation signal, and the resulting energy spectrum may be used to stabilize the gain of the gamma-ray spectroscopy system 10.

A number of properties may make LuAP very well suited for logging operations. LuAP is non-hygroscopic, and has very high stopping power due to its high density and effective Z. Additionally, LuAP has excellent temperature characteristics and shows very little loss of light output with temperature. There are two isotopes of Lutetium: $^{175}$Lu (97.4%) and $^{176}$Lu (2.6%). The latter, being radioactive, decays with a half-life $2.6 \times 10^{10}$y to $^{176}$Hf. The radioactivity results in about 450 counts per second per cubic centimeter (cps/cm$^3$) of the LuAP material. With the known radioactivity of LuAP in the scintillator 12 as a reference, the signal processing circuitry 22 may stabilize the gain of the amplified signal 20.

Figure 2:
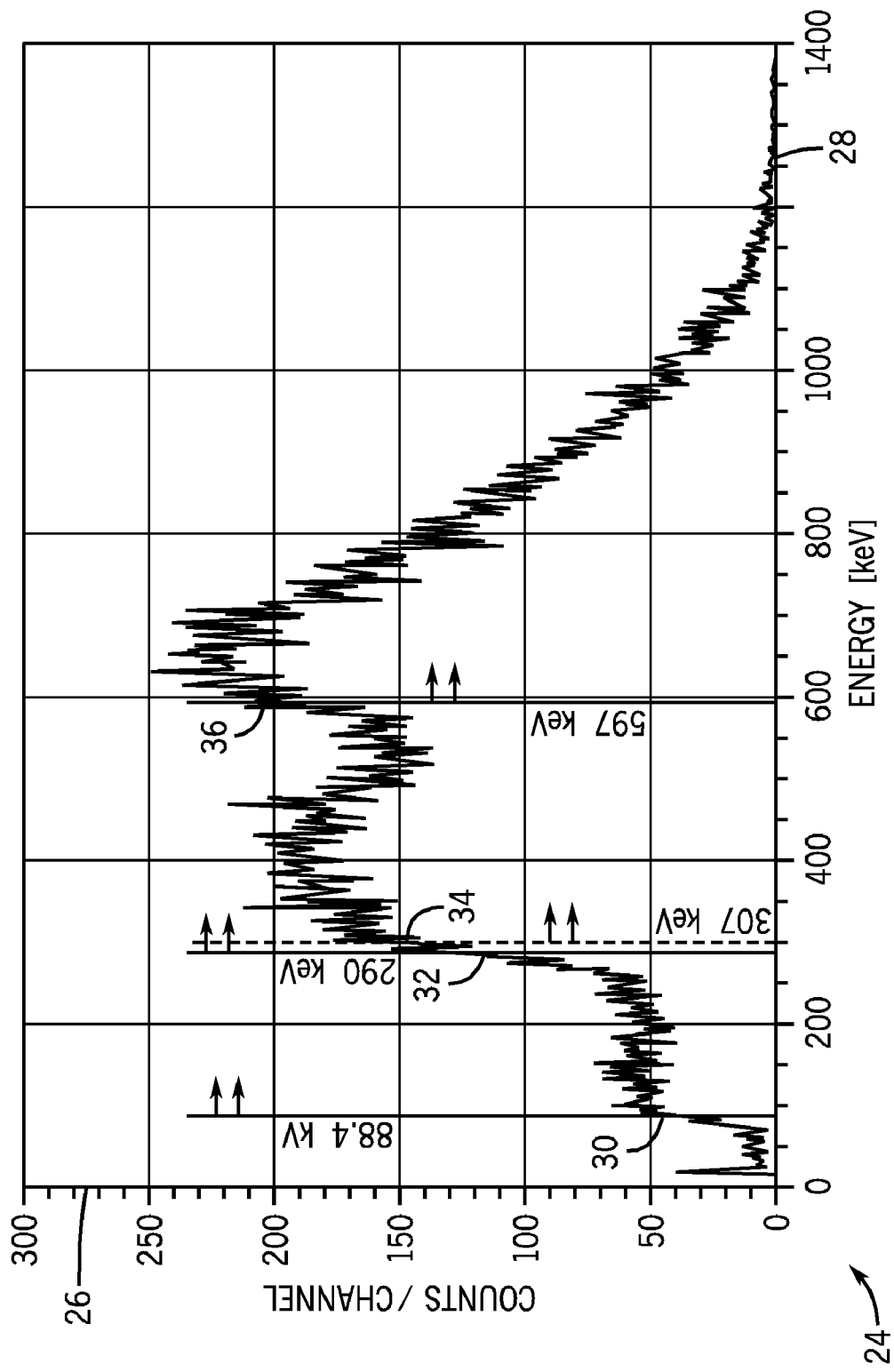
FIG. 2 is a spectrum chart illustrating a background spectrum detected by the scintillator of the gamma-ray spectroscopy system of FIG. 1 in the absence of an external source of radiation.

FIG. 2 depicts a background spectrum chart 24 of the radioactive decay of Lutetium in the scintillator 12 of LuAP when no external radiation source is present. The energy spectrum illustrated in the background spectrum chart 24 was obtained from a cylindrical 12 mm diameter by 12 mm long LuAP scintillator crystal without a stabilization source. An ordinate 26 of the background spectrum chart 24 denotes a number of counts per channel observed, and an abscissa 28 illustrates the energy level observed in units of kilo-electron-Volts (keV).

The observed spectral shape of the background spectrum chart 24 may be explained by the radioactive decay occurring within the LuAP scintillator crystal. As $^{176}$Lu decays to an excited state of $^{176}$Hf, a beta-particle (electron) and a neutrino are emitted; however, only the energy of the beta-particle may be detected by the LuAP scintillator. Since the beta emissions occur within the scintillator crystal, the majority of the beta-particles may be stopped inside the scintillator. Accordingly, energy associated with the stopped beta particles may be deposited in the scintillator, generating a corresponding scintillation signal. Additionally, the production of an excited state of $^{176}$Hf may cause the emission of a gamma-ray, which may also be detected by the LuAP scintillator. The spectral shape of the background spectrum chart 24 may thus reflect the sum of the beta emission energy and the energy of the gamma-rays detected by the LuAP scintillator.

Due to the combination of detected beta-particles and gamma-rays, the scintillation signal of the background spectrum chart 24 shows a number of "humps," but not a single well-defined peak, as may be observed when an external radioactive source is used. Instead, the background spectrum chart 24 shows a series of transitions leading toward a peak energy. Such transitions include a transition 30 at approximately 88.4 keV, a transition 32 at approximately 290 keV, a transition 34 at approximately 307 keV, and a transition 36 at approximately 597 keV. The shape of the background spectrum chart 24, representing the detection of both beta-particles and gamma-rays, may be better understood in light of FIGS. 3 and 4 below, which describe the beta-emission and gamma-ray emission, respectively, associated with the radioactive decay of Lutetium in greater detail.

Figure 3:
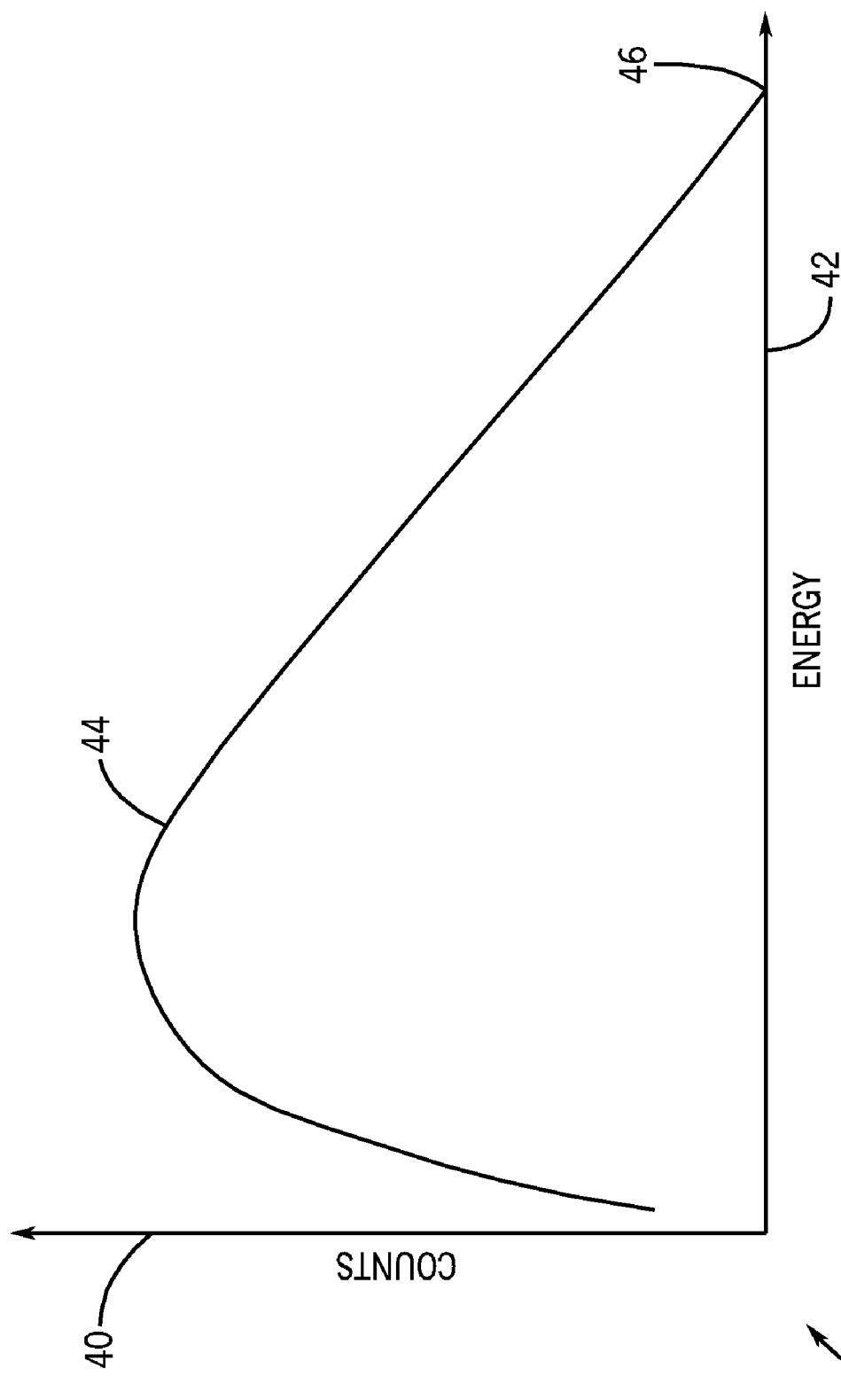
FIG. 3 is a spectrum chart representing a typical spectrum associated with beta emission.

Turning to FIG. 3, a beta emission spectrum chart 38 illustrates the general nature of the beta emission spectrum, which may result when beta-particles are detected by a scintillator. An ordinate 40 of the beta emission spectrum chart 38 illustrates a number of counts that may be observed by a scintillation crystal, and an abscissa 42 illustrates a corresponding relative energy observed. As illustrated in the beta emission spectrum chart 38, a beta emission spectrum curve 44 may form a continuous distribution over the range of possible beta energies. The curve 44 may terminate at an endpoint energy 46, generally representing the maximum beta-energy available in the decay. It should be understood that the beta emission spectrum curve 44 appears as a continuum because the total decay energy of a beta emission is shared between the beta-particle and the associated neutrino during the decay. The neutrino is not detectable in the scintillator 12. Thus, only the energy of the beta-particle may be observed, which may vary depending on the energy of the undetectable neutrino. The endpoint of the energy spectrum represents the full energy available for the beta radiation, i.e. all of the kinetic energy is imparted to the beta-particle (electron) and none to the neutrino.

Figure 4:
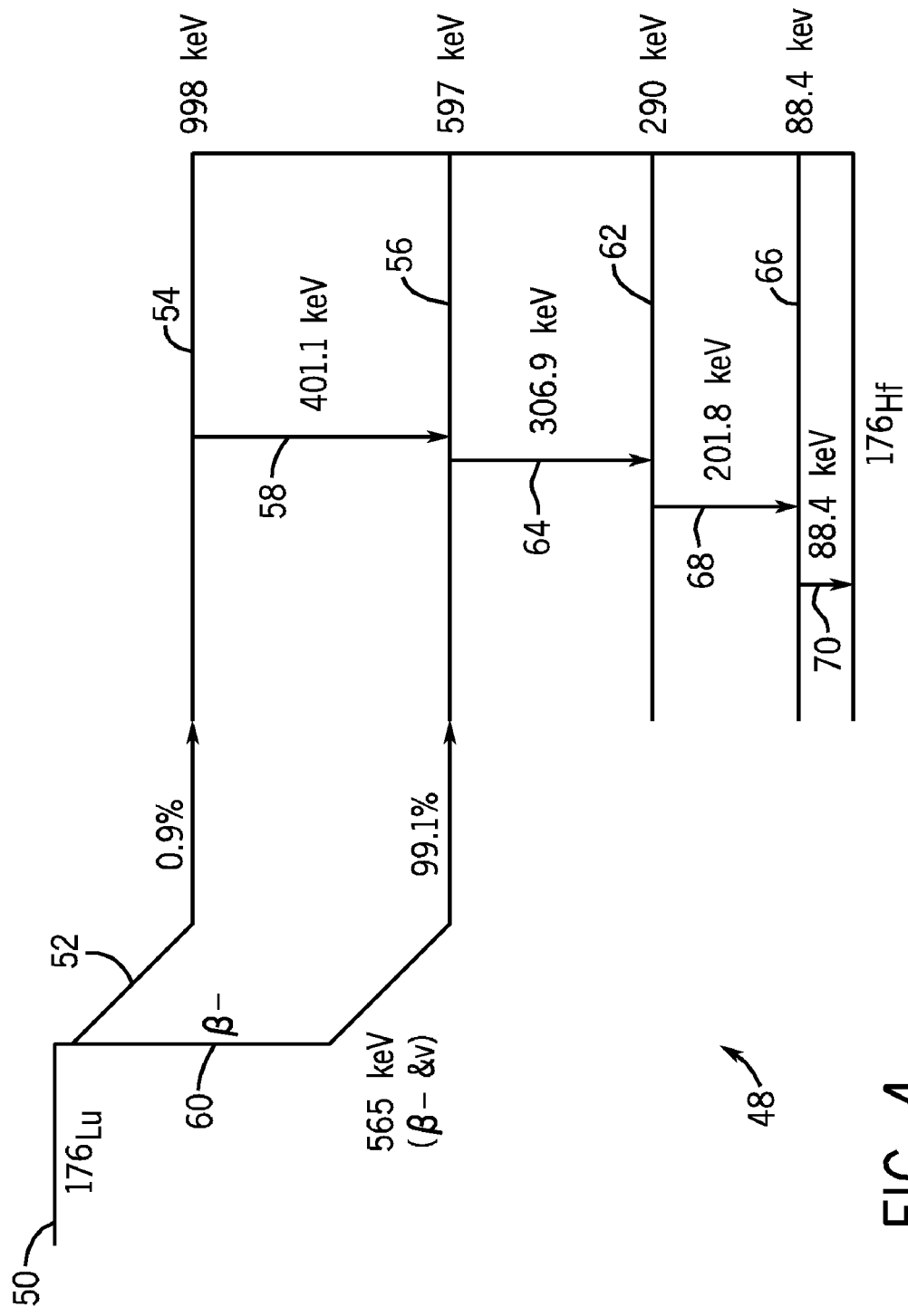
FIG. 4 is a schematic representing a decay scheme of $^{176}$Lu into $^{176}$Hf.

FIG. 4 is a decay scheme 48 describing the radioactive decay of $^{176}$Lu into $^{176}$Hf, which may be one isotope of Lutetium found in a LuAP scintillator. As shown by the decay scheme 48, $^{176}$Lu may decay into an excited state of $^{176}$Hf through beta emission. When beta decay occurs in $^{176}$Lu, at numeral 50, the $^{176}$Lu may be at a total energy level 1162 keV above a ground state of $^{176}$Hf. Approximately 0.9% of the radioactive decay of $^{176}$Lu may result in a beta emission totaling approximately 164 keV, as illustrated by numeral 52. It should be understood, however, that because such a small fraction of all radioactive decay may produce such beta emission, the energy from such emissions may not be readily reflected in the background spectrum chart 24 of FIG. 2.

Following the unlikely beta emission of numeral 52, the $^{176}$Lu may become $^{176}$Hf at an excited state approximately 998 keV above its ground state, as shown by numeral 54. The next energy level of $^{176}$Hf is approximately 597 keV above the ground state, as shown by numeral 56. When the $^{176}$Hf at the excited state of numeral 54 (approximately 998 keV above the ground state), drops to the energy level of numeral 56 (approximately 597 keV above the ground state), a spontaneous gamma-ray emission having a total energy of approximately 401.1 keV may occur, as shown by numeral 58. However, because only approximately 0.9% of beta emissions may produce such a spontaneous emission, the appearance of the gamma-ray at 401.1 keV may also not be readily reflected in the background spectrum chart 24 of FIG. 2.

Approximately 99.1% of radioactive decay in the decay scheme 48 may result in beta emission totaling approximately 565 keV, as illustrated by numeral 60. It should be understood that the total energy of the beta emission of numeral 60 is shared between a detectable beta-particle and an undetectable neutrino. As such, when a series of such beta emissions are detected by the scintillator 12, the resulting spectrum may generally take the shape of the continuous distribution described with reference to FIG. 3. However, as noted below, gamma-ray emissions from the excited $^{176}$Hf may also affect the shape of the detected spectrum.

After the beta emission noted by numeral 60, the $^{176}$Lu becomes $^{176}$Hf at the excited state noted by numeral 56, approximately 597 keV above the ground state. The next energy level of $^{176}$Hf is approximately 290 keV above the ground state, as shown by numeral 62. When the $^{176}$Hf at the excited state of numeral 56 (approximately 597 keV), drops to the excited state of numeral 62 (approximately 290 keV), a spontaneous gamma-ray emission 64 having an energy of approximately 306.9 keV may occur. Similarly, when the $^{176}$Hf at the excited state of numeral 62 (approximately 290 keV) drops to an excited state illustrated by numeral 66 (approximately 88.4 keV), a spontaneous gamma-ray emission 68 having an energy of approximately 201.8 keV may occur. Finally, the $^{176}$Hf at the excited state of numeral 66 (approximately 88.4 keV) may drop to the ground state, causing a spontaneous gamma-ray emission 70 having energy of approximately 88.4 keV.

The gamma-ray emissions 64, 68, and 70 may be detected by the LuAP scintillator. Thus, with reference once more to FIG. 2, the gamma-ray emissions 64, 68, and 70 of FIG. 4 may be represented by the transitions 30, 32, 34, and 36 of the background spectrum chart 24. Specifically, the transition 30 occurring at approximately 88.4 keV may correspond to the gamma-ray emission 70 (88.4 keV); the transition 32 occurring at approximately 290 keV may correspond to the sum of the gamma-ray emissions 70 (88.4 keV) and 68 (201.8 keV); the transition 34 occurring at approximately 307 keV may correspond to the gamma-ray emission 64 (306.9 keV); and the transition 36 occurring at approximately 597 keV may correspond to the sum of the gamma-ray emissions 64, 68, and 70.

While many of the gamma-rays produced through radioactive decay may be detected by the LuAP scintillator described above, some gamma-rays may exit the LuAP scintillator crystal undetected. Considering first the gamma-ray emission 70 (88.4 keV), the transition 30 corresponding to the gamma-ray emission 70 (88.4 keV) occurs largely through internal conversion (86%). For this reason, and further due to the low energy of the gamma-ray emission 70 (88.4 keV), the gamma-ray emission 70 (88.4 keV) is unlikely to escape the LuAP scintillation crystal. Thus, the gamma-ray emission 70 (88.4 keV) is highly likely to be detected by the LuAP scintillator. For the same reasons, if the gamma-ray emission 68 (201.8 keV) is detected by the LuAP scintillator, the gamma-ray emission 70 (88.4 keV) will most likely be absorbed as well, and if the gamma-ray emission 64 (306.9 keV) is detected by the LuAP scintillator, the gamma-ray emissions 68 (201.8 keV) and 70 (88.4 keV) will most likely be absorbed as well. It should be understood that in a larger LuAP crystal, the detection of the gamma-ray from the transition 36 occurring around 597 keV would thus become dominant as the likelihood of gamma-rays escaping from the crystal may substantially decrease.

The features observed in the background spectrum chart 24 of FIG. 2 may be used to stabilize the gain of the gamma-ray spectroscopy system 10. However, because the background spectrum chart 24 lacks a single peak, a traditional approach to gain regulation may not be suitable without additional processing. As described below, one manner of additional processing to enable the observed spectrum from the chart 24 to be used for gain regulation may involve differentiating the measured spectrum, as illustrated with reference to FIG. 5 below.

Figure 5:
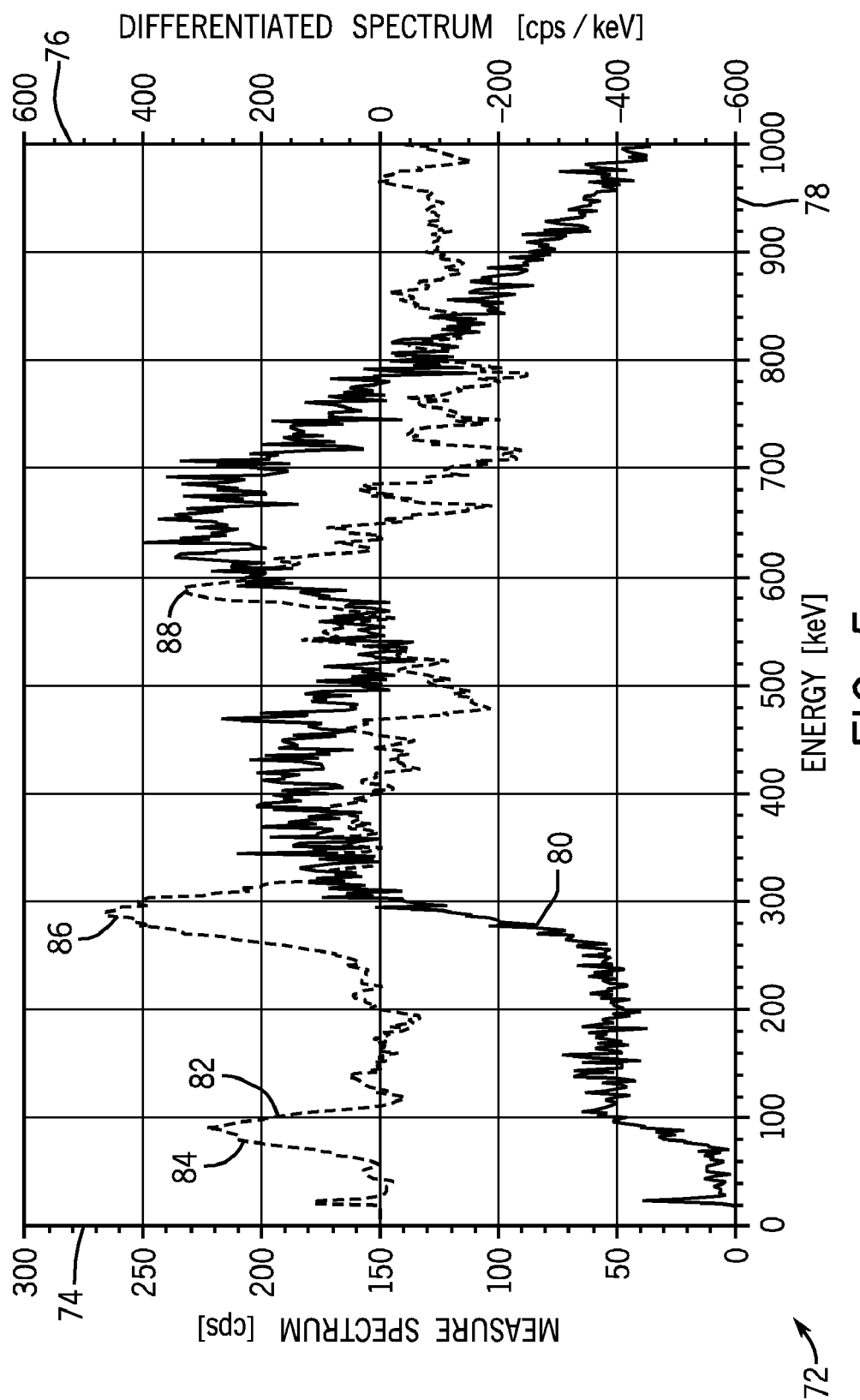
FIG. 5 is a spectrum chart illustrating the background spectrum of FIG. 2 and a differentiated background spectrum.

FIG. 5 is a differentiated background spectrum chart 72, which illustrates both the measured spectrum of the background spectrum chart 24 and a differentiated spectrum resulting from the differentiation with respect to energy of the measured spectrum of the background spectrum chart 24. In the differentiated background spectrum chart 72, a first ordinate 74 may represent the measured spectrum in units of counts per second (cps) and a second ordinate 76 may represent a differentiated spectrum in units of counts per second per kilo-electron-Volt (cps/keV). An abscissa 78 represents energy in units of keV from 0 to 1000 keV. A numeral 80 generally denotes the measured spectrum and a numeral 82 generally denotes the differentiated spectrum.

As illustrated in the differentiated background spectrum chart 72 of FIG. 5, the differentiated spectrum 82 may include a series of peaks 84, 86, and 88. As should be appreciated, the peaks 84, 86, and 88 correspond to the transitions 30, 32 and 34, and 36, respectively. Since the transitions occur at precise energy levels, for reasons described above, the peaks 84, 86, and 88 may also occur at the same precise energy levels. Thus, isolating one of the peaks of the differentiated spectrum 82, such as the peak 86, may enable gain regulation using a traditional approach.

Figure 6:
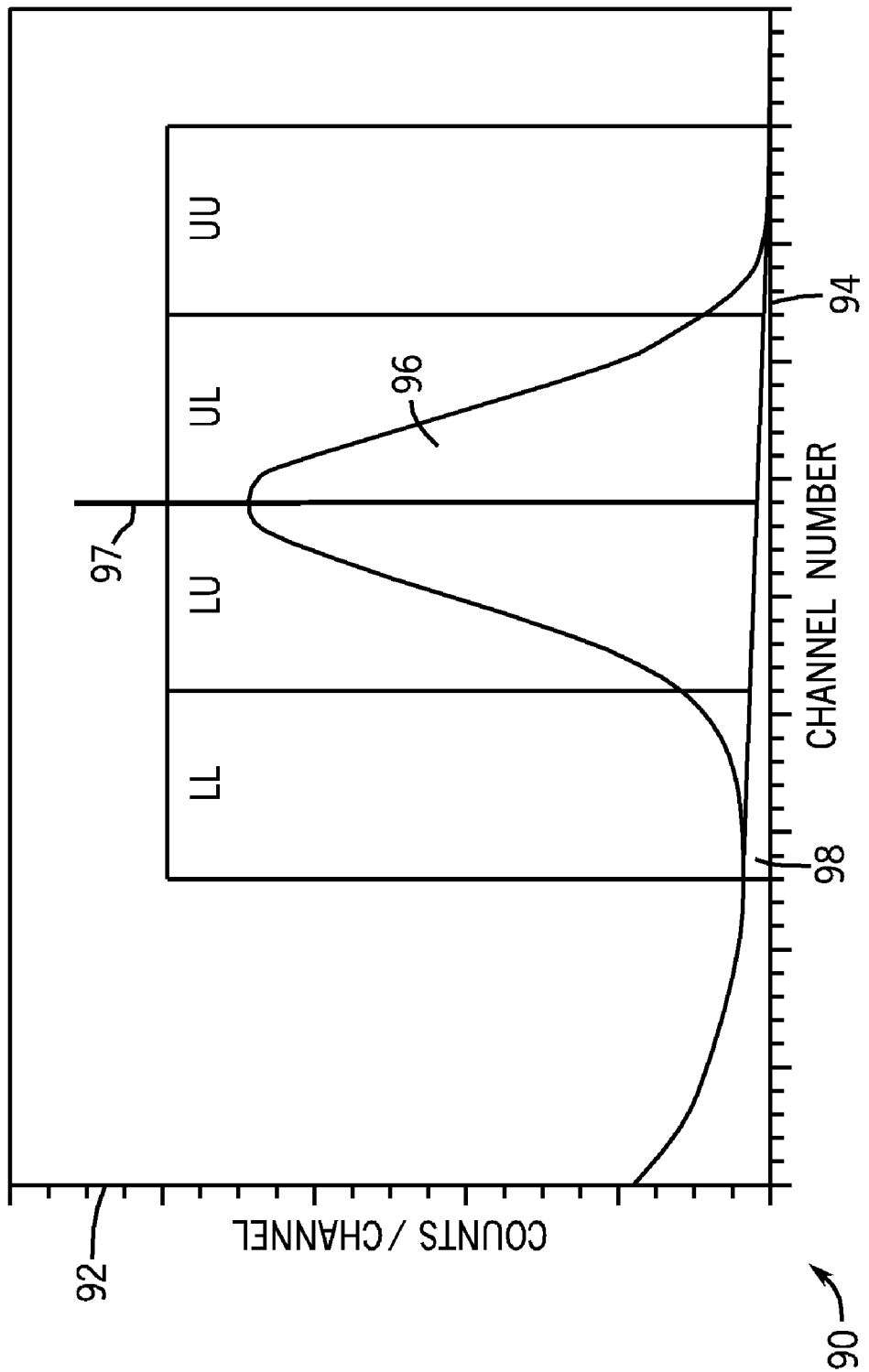
FIG. 6 is a spectrum chart illustrating a manner of gain stabilization using a four-window algorithm.

FIG. 6 generally illustrates the use of a four-window algorithm for gain stabilization with a chart 90. The chart 90 includes an ordinate 92 representing counts per channel, and an abscissa 94 representing the channel number. As illustrated in the chart 90, a net peak 96 may surround a regulation channel 97, which may represent a particular energy that is targeted for use in gain regulation. A linear background 98 may be located beneath the net peak 96. Using four windows LL, LU, UL, and UU that divide the net peak 96, an error signal may be determined as follows:

$$\text{Error} = (LU - UL) - \frac{LL - UU}{3}. \quad (1)$$

The error signal of Equation (1) above generally represents the difference between the areas of the two inner windows, LU and UL, which surround the regulation channel 97, after subtracting a linear background. As should be appreciated, the error signal of Equation (1) may be used for gain stabilization.

Figure 7:
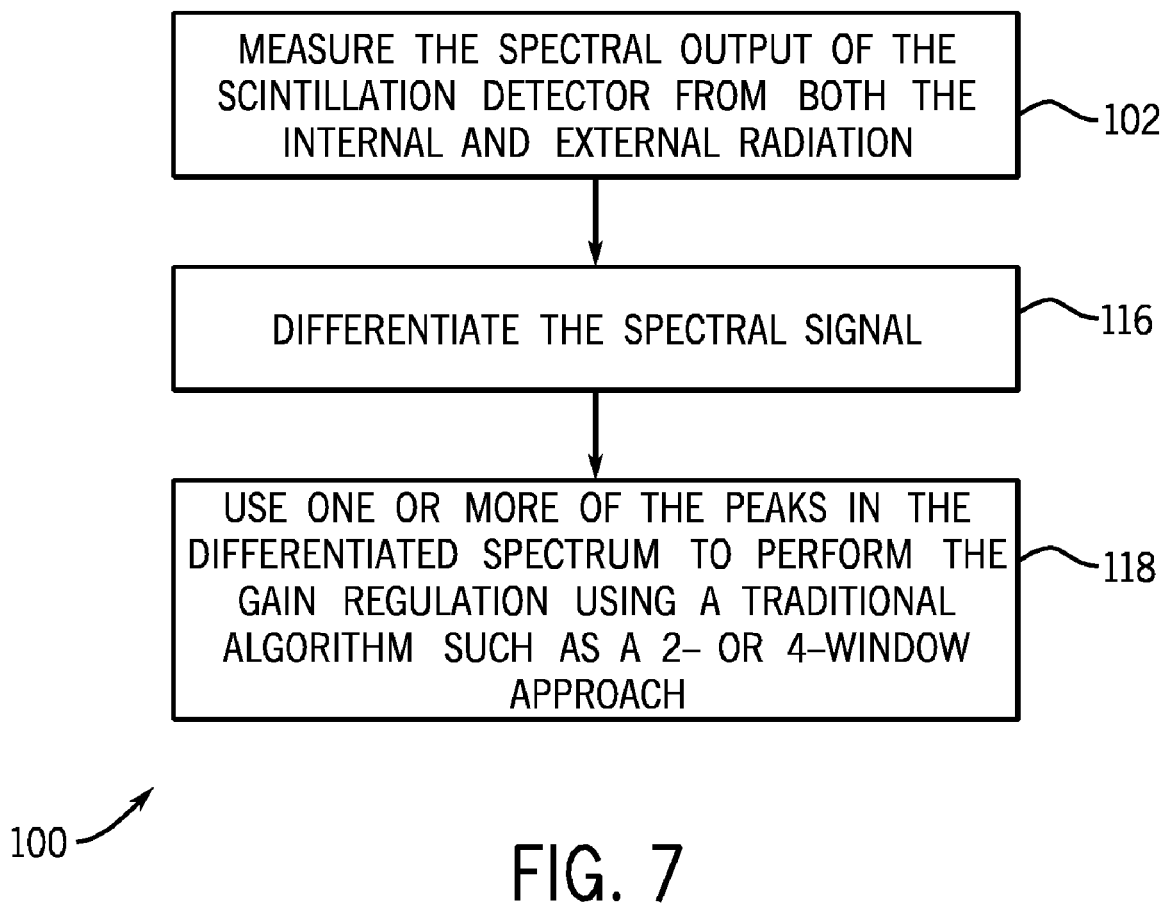
FIG. 7 is a flowchart describing a technique for stabilizing the gain of the gamma-ray spectroscopy system of FIG. 1 in accordance with an embodiment.
Figure 8:
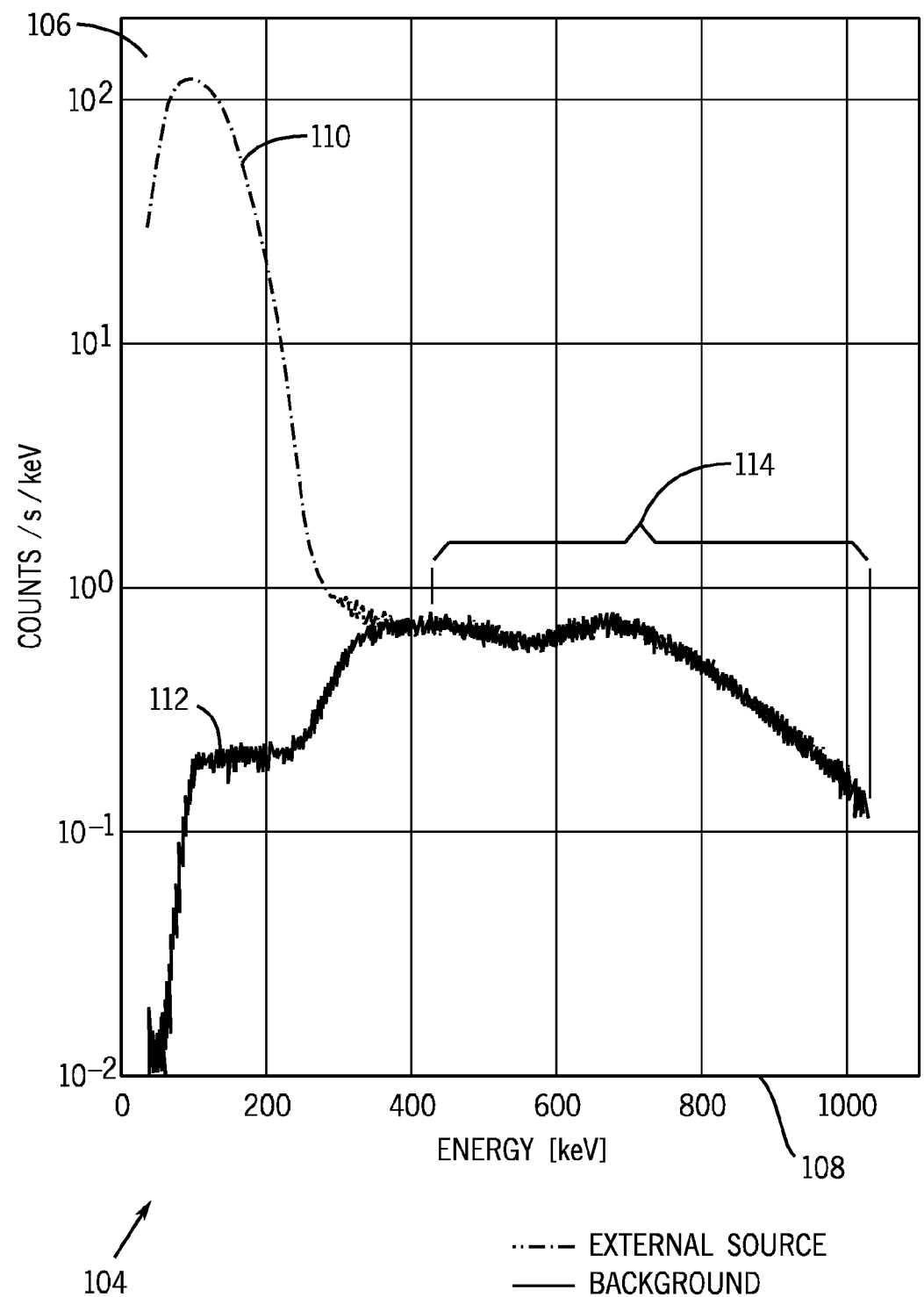
FIG. 8 is a spectrum chart illustrating the spectrum measured in the presence of external radiation with an energy less than 360 kilo-electron-volts (keV)

Turning to FIG. 7, a flowchart 100 describes a manner of performing gain regulation of the gamma-ray spectroscopy system 10. In a first step 102, the spectrum output by the scintillator 12 with an external source present may be measured. Such a spectrum may be by FIG. 8, which is described briefly. FIG. 8 shows a spectrum chart 104, which may represent the spectrum obtained with the scintillation detector in the presence of external radiation to be measured. The chart 104 includes an ordinate 106 representing counts per second per keV and an abscissa 108 representing energy in keV. An external spectrum 110 illustrates a response to external radiation and an internal spectrum 112 illustrates a response to internal radiation from radioactive components of the scintillator 12. A region 114 represents a region of spectrum unaffected by external radiation. As shown in the chart 104, the spectral region of interest for the gain regulation is clearly separated from the spectrum of external x-rays, since the detected external x-rays have lower energy.

In a next step 116, the measured spectrum signal may be differentiated, as illustrated by the differentiated background spectrum chart 72 of FIG. 5. In step 118, the peaks 84, 86, or 88 of the differentiated spectrum signal 82 may be used in traditional gain regulation techniques (e.g., using two or four windows) or any other suitable peak-detection technique, in the manner described above with reference to the chart 90 of FIG. 6. By way of example, because the peak 86, which corresponds to the transition 32, is particularly apparent, a regulation channel 97 of approximately 290 keV may be used. It should be appreciated, however, that any other traditional techniques may additionally or alternatively be used to perform gain regulation once the differentiated spectrum signal has been obtained. The same approaches can be used with the spectrum shown in FIG. 8.

Figure 9:
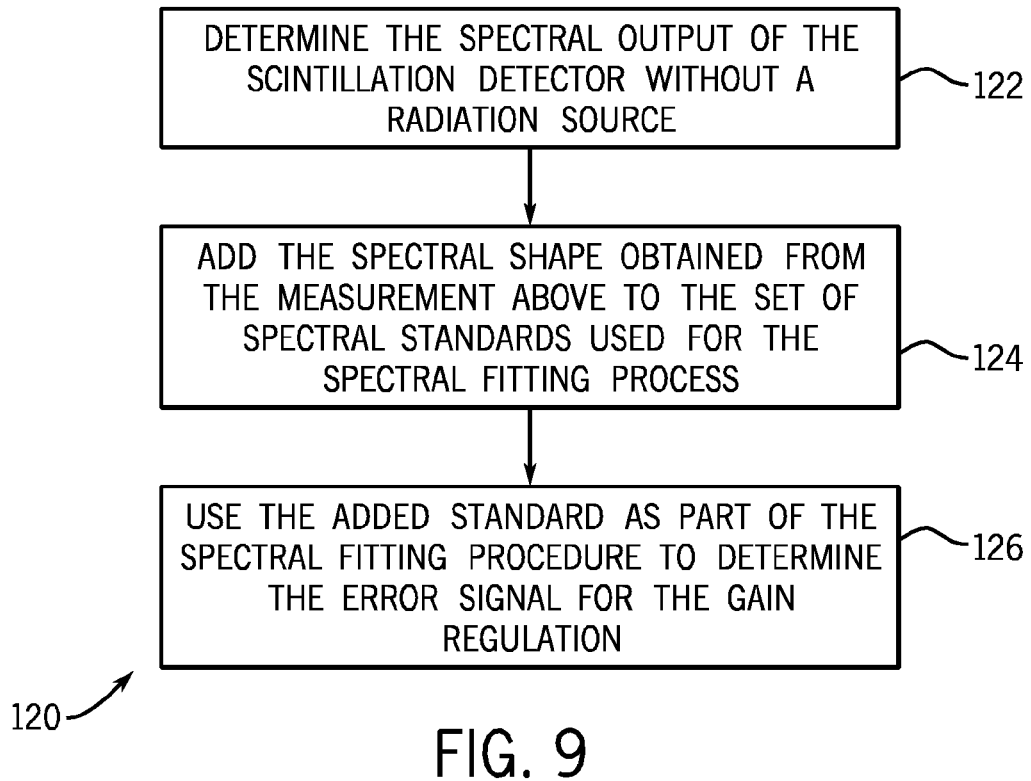
FIG. 9 is a flowchart describing another technique for stabilizing the gain of the gamma-ray spectroscopy system of FIG. 1 in accordance with an embodiment.

Turning to FIG. 9, a flowchart 120 describes another manner of performing gain stabilization for the gamma-ray spectroscopy system 10. In step 122, the spectrum output by the scintillator 12 without an external radiation source present may be measured. By way of example, the background spectrum chart 24 of FIG. 2 may represent such a measured spectrum. In a subsequent step 124, the measured spectrum may be used as a standard spectrum for fitting procedures when the gamma-ray spectroscopy system 10 is used to detect radiation downhole. In step 126, the spectral gain may be adjusted to match the known standard spectrum signal, stabilizing the gain. Such a technique is described in greater detail in U.S. Pat. No. 5,360,975, which is incorporated herein by reference.

Figure 10:
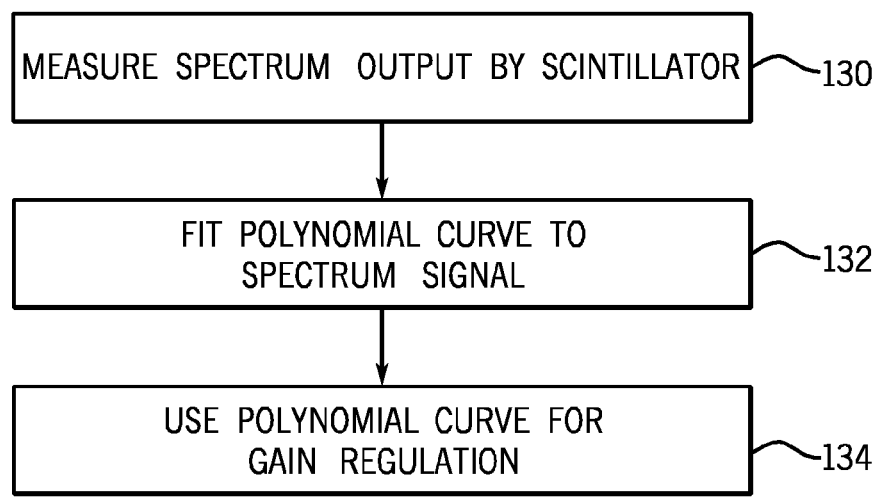
FIG. 10 is a flowchart describing another technique for stabilizing the gain of the gamma-ray spectroscopy system of FIG. 1 in accordance with an embodiment.

Turning to FIG. 10, a flowchart 128 describes another manner of performing gain stabilization for the gamma-ray spectroscopy system 10. In a first step 130, the spectrum output by the scintillator 12 in the presence of an external radiation source present may be measured. By way of example, the spectrum chart 104 of FIG. 8 may represent such a measured spectrum. In a subsequent step 132, a polynomial curve, such as a second or third order polynomial, may be fit to the measured spectrum to obtain a determination of the position of specific features and peaks. In step 134, the polynomial curve obtained in step 132 may be used to determine the actual position of specific features. Comparison of the actual position of the features and the desired position can be used to obtain an error signal to perform gain regulation using a traditional approach.

As noted above, the scintillator 12 may include materials having a natural radioactivity other than Lutetium, such as Lanthanum. Lanthanum may be found in two naturally-occurring isotopes: $^{138}$La (0.09%) and $^{139}$La (99.91%). The isotope $^{138}$La decays with a half-life of $1.1 \times 10^{11}$ y to $^{138}$Ba through electron-capture. As a result, a background spectrum detected by a scintillator containing Lanthanum may provide a single, well-defined peak.

Particularly, the gamma-ray energy associated with Lanthanum decay is 1435.8 keV. Because the decay is accompanied by the capture of an inner shell electron (typically, a K-electron), however, a K-x-ray of either 33.4 keV or, less frequently, 37.8 keV may be emitted. The simultaneous detection of both the gamma-ray (1435.8 keV) and the K-x-ray (33.4 keV) may produce a spectrum that peaks at approximately 1470 keV.

Figure 11:
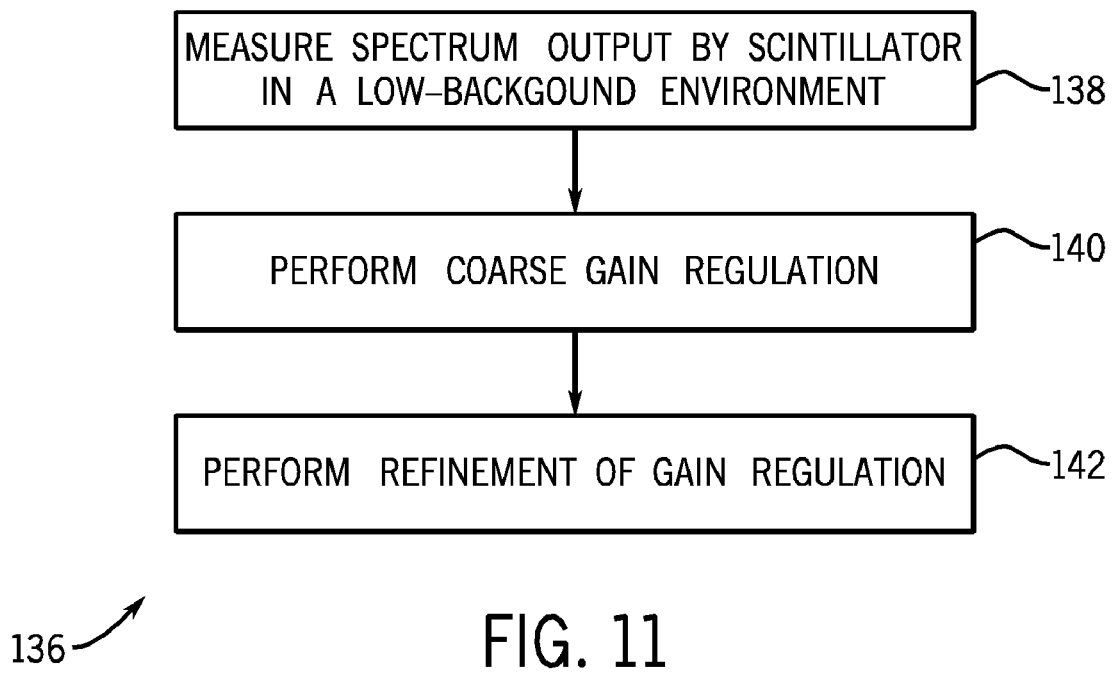
FIG. 11 is a flowchart describing another technique for stabilizing the gain of the gamma-ray spectroscopy system of FIG. 1 in accordance with an embodiment.

Turning to FIG. 11, a flow chart 136 may describe another manner of performing gain regulation in the gamma-ray spectroscopy system 10 in a low-background environment (i.e., an environment with minimal background radiation), which may be particularly effective when the scintillator 12 contains a material such as Lanthanum. In a first step 138, the spectrum output by the scintillator 12 may be measured in a low background environment. Particularly, it should be appreciated that the scintillator 12 may be used for the detection of natural gamma-rays, even though the natural radioactivity of the scintillator 12 may lead to an inflation of the statistical error. Gain regulation may take place in steps 140 and 142. In step 140, the signal processing circuitry 22 may perform course gain regulation. Coarse gain regulation may be described in greater detail in U.S. Pat. No. 7,081,616, which is incorporated herein by reference in its entirety. In step 142, a windows algorithm may be used to perform a refinement of the gain regulation. The windows algorithm may be outlined in U.S. Pat. No. 3,922,541, which is incorporated herein by reference in its entirety. Alternatively, an approach using the full spectrum, i.e. the all the details of the spectral shape as described in U.S. Pat. No. 5,360,975 may be employed.

In some environments involving high count rates from external radiation the gain regulation using a weak source may be difficult or impractical, in particular if the energy spectrum of the external radiation overlaps with essential features of the spectrum used for gain regulation. If the source of the external radiation is pulsed (i.e., the external radiation gets turned on and off in regular intervals), the gain stabilization may be performed during time intervals during which the external radiation is absent or very low. Such a pulsed environment can be found when a pulsed neutron source is used to induce gamma-rays in the material surrounding the tool or if a pulsed source of x-rays is used.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method comprising:
generating light corresponding to gamma-rays detected during well logging using a detector comprising a scintillator having a natural radioactivity;
generating an electrical signal output from the detector corresponding to the light; and
stabilizing a gain of the electrical signal based on the natural radioactivity of the scintillator.

2. The method of claim 1, wherein generating the light comprises using a scintillator containing Lutetium.

3. The method of claim 1, wherein generating the light comprises using a scintillator containing Lanthanum.

4. The method of claim 1, wherein stabilizing the gain of the electrical signal is based at least in part on a differentiation of a background spectrum, wherein the background spectrum is a spectrum detected by the scintillator in the absence of external radiation in an energy range of interest.

5. The method of claim 4, wherein stabilizing the gain of the electrical signal comprises determining an error signal from a peak in the differentiation of the background spectrum.

6. The method of claim 5, wherein stabilizing the gain of the electrical signal comprises determining the error signal, wherein the error signal is based on the difference between two or more windows surrounding a regulation channel of the peak.

7. The method of claim 1, wherein stabilizing the gain of the electrical signal is based at least in part on a comparison to a background spectrum, wherein the background spectrum is a spectrum detected by the scintillator in the absence of an external source of radiation.

8. The method of claim 7, wherein stabilizing the gain of the electrical signal comprises adjusting the gain of the electrical signal based at least in part on the comparison to the background spectrum.

9. The method of claim 1, wherein stabilizing the gain of the electrical signal is based at least in part on a polynomial curve fitted to a background spectrum, wherein the background spectrum is a spectrum detected by the scintillator in the absence of an external source of radiation in an energy range of interest for gain regulation.

10. The method of claim 1, comprising emitting pulsed radiation from an external radiation source into a surrounding geological formation to generate the gamma-rays.

11. The method of claim 10, wherein the emitted pulsed radiation from the external radiation source comprises emitted pulsed radiation from a neutron source.

12. The method of claim 10, wherein the emitted pulsed radiation from the external radiation source comprises emitted pulsed radiation from an x-ray source.

13. The method of claim 1, wherein the method is performed in the recited order.

14. A gamma-ray spectroscopy system comprising:
a detector comprising a scintillator having a natural radioactivity configured to detect gamma-rays and to output light corresponding to the gamma-rays;
a photodetector configured to detect the light and to output an electrical signal output from the detector corresponding to the light; and
signal processing circuitry configured to stabilize a gain of the electrical signal based on the natural radioactivity of the scintillator.

15. The system of claim 14, wherein the scintillator contains Lutetium, Lanthanum, or Bismuth Germanium Oxide.

16. The system of claim 14, wherein the signal processing circuitry is configured to stabilize the gain of the electrical signal based at least in part on a differentiation of a background spectrum, wherein the background spectrum is a spectrum detected by the scintillator in the absence of an external source of radiation.

17. The system of claim 16, wherein the signal processing circuitry is configured to determine an error signal from a peak in the differentiation of the background spectrum.

18. The system of claim 17, wherein the error signal is based on the difference between two or more windows surrounding a regulation channel of the peak.

19. The system of claim 14, wherein the signal processing circuitry is configured to compare a spectrum represented by the electrical signal to a background spectrum, wherein the background spectrum is a spectrum detected by the scintillator in the absence of an external source of radiation.

20. The system of claim 19, wherein the signal processing circuitry is configured to adjust the gain of the electrical signal based at least in part on the comparison of the spectrum represented by the electrical signal to the background spectrum.

21. The system of claim 14, wherein the signal processing circuitry is configured to stabilize the gain based at least in part on a polynomial curve fitted to a background spectrum, wherein the background spectrum is a spectrum detected by the scintillator in the absence of an external source of radiation.

22. The system of claim 14, comprising an external source configured to emit pulsed radiation into a surrounding geological formation to generate the gamma-rays, wherein the signal processing circuitry is configured to stabilize the gain during time intervals when external radiation emitted is low.

23. A method comprising:
measuring a spectrum of nuclear radiation in a low background environment using a detector comprising a scintillator having a natural radioactivity; and
stabilizing a gain of the measured spectrum at the detector based on the natural radioactivity of the scintillator.

24. The method of claim 23, wherein measuring the spectrum comprises using a scintillator containing Lanthanum.

25. The method of claim 23, wherein stabilizing the gain of the measured spectrum comprises performing coarse gain regulation before performing refined gain regulation with a windows algorithm involving two or more windows.

26. The method of claim 23, wherein stabilizing the gain of the measured spectrum comprises stabilizing the gain around a regulation channel of approximately 1470 keV.

27. Signal processing circuitry for a spectroscopy system comprising:
- a processor configured to process a spectrum signal from a detector comprising a scintillator having a natural radioactivity; and
- a memory device configured to supply instructions to the processor to stabilize the gain of the spectrum signal based on the natural radioactivity of the scintillator intrinsic to the detector.

28. The signal processing circuitry of claim 27, wherein the memory device is configured to supply instructions to the processor to stabilize the gain of the spectrum signal based at least in part on a differentiation of a background spectrum, wherein the background spectrum is a spectrum detected by the scintillator in the absence of an external source of radiation.

29. A method comprising:
- detecting a spectrum of nuclear radiation during well logging using a detector comprising a scintillator having a natural radioactivity; and
- stabilizing the gain of the spectrum based on the natural radioactivity of the scintillator intrinsic to the detector.

30. The method of claim 29, comprising emitting pulsed radiation from an external radiation source into a surrounding geological formation to generate the nuclear radiation, wherein the gain is stabilized during time intervals when the radiation emitted is low.

* * * * *